(12) United States Patent
Hecht, Jr. et al.

(10) Patent No.: US 7,974,922 B1
(45) Date of Patent: Jul. 5, 2011

(54) COMPUTER-DRIVEN EXCEPTION PROCESSING SYSTEM

(75) Inventors: Alan W Hecht, Jr., Chanhassen, MN (US); Robert Scot Thomas, Monticello, MN (US); Ryan Sven Lindstrom, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 522 days.

(21) Appl. No.: 12/036,810

(22) Filed: Feb. 25, 2008

Related U.S. Application Data

(60) Provisional application No. 60/974,639, filed on Sep. 24, 2007.

(51) Int. Cl.
*G06Q 40/00* (2006.01)

(52) U.S. Cl. .............................. 705/45; 705/39; 705/35

(58) Field of Classification Search .................... 705/39, 705/45, 35, 41
See application file for complete search history.

(56) References Cited

U.S. PATENT DOCUMENTS

| | | | |
|---|---|---|---|
| 4,264,808 A | 4/1981 | Owens et al. | |
| 4,948,174 A | 8/1990 | Thomson et al. | |
| 4,974,878 A | 12/1990 | Josephson | |
| 5,121,945 A | 6/1992 | Thomson et al. | |
| 5,122,950 A | 6/1992 | Benton et al. | |
| 5,220,501 A | 6/1993 | Lawlor et al. | |
| 5,237,159 A | 8/1993 | Stephens et al. | |
| 5,265,008 A | 11/1993 | Benton et al. | |
| 5,412,190 A | 5/1995 | Josephson et al. | |
| 5,532,464 A | 7/1996 | Josephson et al. | |
| 5,668,897 A | 9/1997 | Stolfo | |
| 5,691,524 A | 11/1997 | Josephson | |
| 5,748,780 A | 5/1998 | Stolfo | |
| 5,783,808 A | 7/1998 | Josephson | |
| 5,832,463 A * | 11/1998 | Funk ............................. | 705/35 |
| 6,629,081 B1 | 9/2003 | Cornelius et al. | |
| 7,702,588 B2 * | 4/2010 | Gilder et al. .................... | 705/44 |
| 2004/0133516 A1 | 7/2004 | Buchanan et al. | |
| 2005/0065893 A1 | 3/2005 | Josephson | |
| 2005/0071283 A1 | 3/2005 | Randle et al. | |
| 2006/0015450 A1 | 1/2006 | Guck et al. | |
| 2006/0106717 A1 * | 5/2006 | Randle et al. ................... | 705/45 |
| 2007/0288382 A1 * | 12/2007 | Narayanan et al. ............. | 705/45 |

FOREIGN PATENT DOCUMENTS

| | | |
|---|---|---|
| EP | 481135 | 4/1992 |
| EP | 519843 | 12/1992 |
| EP | 504287 | 7/1999 |
| EP | 1431900 | 6/2004 |
| EP | 1471475 | 10/2004 |
| EP | 1659526 | 5/2006 |
| WO | WO0184436 | 11/2001 |
| WO | WO2005038557 | 4/2005 |
| WO | WO2005040973 | 5/2005 |

(Continued)

OTHER PUBLICATIONS

Nichols, B.; An Image-Enabled Back Office Puts Your Bank in the Lead with Check 21; Jun. 27, 2007 11:03 AM; http://www.bankersonline.com/vendor_guru/carreker/carreker_check21a.html.

(Continued)

*Primary Examiner* — Elda Milef
(74) *Attorney, Agent, or Firm* — Merchant & Gould P.C.

(57) ABSTRACT

A computer-implemented system to track, process, and report exceptions arising from processing of electronic representations of checks and other financial documents.

8 Claims, 6 Drawing Sheets

FOREIGN PATENT DOCUMENTS

| WO | WO2007056426 | 5/2007 |
|----|--------------|--------|
| WO | WO2007067350 | 6/2007 |

OTHER PUBLICATIONS

Kroll, K.; Business Finance Article Archives: Remittance Processing Gets Smoother; Jun. 27, 2007 11:15 AM; http://www.businessfinancemag.com/magazine/archives/article.html?articleID=14450.

Marlin, S.; Is ECP ready for prime time?; Bank Systems & Technology v34n12 pp. 30-36; Dec. 1997; and.

Marlin, S.; Electronic Check Presentment; Bank Systems + Technology, p. N/A; Dec. 1997.

Wausau Financial Systems; Check 21 Launches a New Era of Payment Processing; Jun. 27, 2007 11:04 AM; http://www.expert-insights.com/report.asp?id=68.

Check Collections (Pre-encoded Deposits); Jun. 27, 2007 11:04 AM; http://www.usbank.com/cgi_w/cfm/commercial_business/products_and_services/treasury_mgmt/collections.cfm.

Check scanners, software and services to benefit your business; www.idt-inc.com/check21/CheckImagingSolution.pdf.

DCI and Check 21; Jun. 27, 2007 11:04 AM; http://www.datacenterinc.com/News/DCI%20and%20Check%2021.htm.

Eds.ch: News Releases; Jun. 27, 2007 11:04 AM; http://www.eds.ch/index.php?id=275&backPID=83&pS=1017612000&pL=2591999&arc=1&tews=95&L=1.

Veltri, S.C. et al.; Payments: 2004 Developments; Business Lawyer v60n4 pp. 1669-1697 Aug. 2005.

Veltri, S.C. et al.; Payments; Business Lawyer v59n4 pp. 1591-1618; Aug. 2004.

Stevens, E.; Electronic money and the future of central banks; Federal Reserve Bank of Cleveland. Economic Commentary pp. 1-4; Mar. 1, 2002.

Coleman, S.P.; The Evolution of the Federal Reserve's intraday credit policies; Federal Reserve Bulletin v88n2 pp. 67-84; Feb. 2002.

Emmons, W.R.; Price stability and the efficiency of the retail payments system; Federal Reserve Bank of St. Louis Review v78n5 pp. 49-68; Sep./Oct. 1996.

Nine Ideas That Shaped Financial Services in 2001; American Banker, p. 10; Jan. 4, 2002.

Collecting Payments Electronically Just Got Easier; Princeton eCom Vice President Address at NACHA Conference; PR Newswire; Oct. 26, 2000.

Check clearing now entering the electronic age; Finance and Commerce Daily Newspaper, INA; Nov. 11, 2003.

Fletcher, M.M.; Understanding and preventing payment fraud; Government Finance Rev 19, 6, 26(7); Dec. 2003.

Wausau Financial Unveils New Initiatives at Tawpi; Item Processing Report vol. 11 Issue: 15; Phillips Business Information; Aug. 3, 2000.

Pegasystems' new Smart Adjust 4.1 automates exception processing for retail payments an enables compliance with 'Check 21' regulations; http://www.e-consultancy.com/news-blog/210574/pegasystems-new-smar...liance-with-check-21-regulations.html?keywords=electronic+payments; Jun. 27, 2007.

Williams, S.; The Triple Force of Electronic Check Clearing—ARC-Check 21-Image Exchange; http://www.regulusgroup.com/PDF/triple_force.pdf.

* cited by examiner

| 500 | |
|---|---|
| 502 | LEGAL GROUP - MONETARY |
| 504 | LEGAL GROUP – NON-MONETARY |
| 506 | ILLEGIBLE |
| 508 | PIGGYBACK |
| 510 | OUT OF BALANCE |
| 512 | CURRENCY |

FIGURE 6A

EPS Exception Processing System

EPS Pick List by Paper Location

Paper Location: 0000003     Sorted by Cycle Date
Sort by : Exception Type   Amount

| Print? | Cycle Date | Capture Site | Exception Type | Entry Number | Block Number | ISN Range | Batch ID | Amount | Found | Missing | Holdover |
|---|---|---|---|---|---|---|---|---|---|---|---|
| ☐ | 10/20/2005 | 11 | Piggyback | 101010 | 222222 | 12001 | 12001 | 50.00 | ○ | ○ | ○ |
| ☐ | 10/20/2005 | 11 | Piggyback | 101010 | 222222 | 12001 | 12001 | 1,150,000.00 | ○ | ○ | ○ |
| ☐ | 10/20/2005 | 11 | Bad Image | 101010 | 222222 | 12001 | 12001 | 150.00 | ○ | ○ | ○ |
| ☐ | 10/20/2005 | 11 | Legal | 101010 | 222222 | 12001 | 12001 | 500.05 | ○ | ○ | ○ |
| ☐ | 10/20/2005 | 11 | Bad Image | 101010 | 222222 | 12001 | 12001 | 50.00 | ○ | ○ | ○ |
| ☐ | 10/20/2005 | 11 | Legal | 101010 | 222222 | 12001 | 12001 | 4,321.00 | ○ | ○ | ○ |
| ☐ | 10/20/2005 | 11 | Legal | 101010 | 222222 | 12001 | 12001 | 50.00 | ○ | ○ | ○ |
| ☐ | 10/20/2005 | 11 | Missing Items | 101010 | 222222 | 12001 | 12001 | 49.01 | ○ | ○ | ○ |
| ☐ | 10/20/2005 | 11 | Missing Items | 101010 | 222222 | 12001 | 12001 | 25.00 | ○ | ○ | ○ |

[Print Checked Items]     [Reconcile Checked Items]   [Reset All]

Footer Link 1 · Footer Link 2 · Footer Link 3

© Copyright 1999-2005 Wells Fargo. All rights reserved.

FIGURE 6B

COMPUTER-DRIVEN EXCEPTION PROCESSING SYSTEM

CROSS-REFERENCE TO RELATED APPLICATIONS

This application claims the benefit of the following earlier-filed U.S. Provisional Application in accordance 35 USC 119: Application No. 60/974,639, entitled EXCEPTION PROCESSING SYSTEM, filed on Sep. 24, 2007 in the names of Hecht, Thomas, and Lindstrom. The foregoing application in its entirety is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to electronic processing of scanned financial documents. More particularly, the invention concerns a computer-implemented system to track, process, and report exceptions arising from processing of electronic representations of checks and other financial documents.

2. Description of the Related Art

In 2004, the U.S. Congress enacted the "Check Clearing for the Twenty-First Century Act." People call it "Check21," for short. With the goal of reducing waste and delay in check processing, Check21 enabled banks to handle checks electronically. Instead of transporting paper checks from one institution to another, Check21 allows banks to process checks electronically. Banks capture an image of the front and back of the check along with the associated payment information and transmit this electronically. "Truncation" refers to the removal of an original paper check from the check processing stream, and use of substitute electronic check instead. Thereafter, the use of the image in place of the paper check is referred to as "image exchange." If someone along the line requires a paper check, the bank can use the electronic image to create a paper proxy called an image replacement document (IRD). Outside the realm of Check21, it has been a logical extension for banks to scan and digitally process documents beyond checks, such as deposit slips, withdrawal slips, and other such documents.

After Check21 came into effect, the first banks to implement image exchange did so by adopting a centralized scanning model. With centralized scanning, a bank routes paper checks from the bank's various branches or other deposit accepting locations (cash vaults, lockbox operations, etc.) to a central facility, and captures/scans them there. This minimizes the overhead required to start using image exchange, since it processes the checks using a central staff and central computer hardware. Of course, various computers outside this central facility must still be reprogrammed to communicate according to the new requirements of image exchange. For instance, computers must be programmed to retrieve images of checks to satisfy customer inquiries, prepare statements, conduct research, and the like. Further, central computers of the bank must be programmed to electronically transmit the check images to other banks, which is really the main idea in performing image exchange in the first place.

The next extension of image exchange has been "distributed capture." With distributed capture, these same documents are digitized earlier relative to the point of presentment. For instance, local bank branches may perform on-site digitization, instead of forwarding the paper checks to a central processing facility.

Regardless of whether a bank uses scanned financial documents, paper, or both, most banks employ a central outfit to perform functions such as check clearing, settlement, balancing, and other traditional banking functions. As for the specific task of processing scanned financial documents in this context, various software platforms have arisen. Many of these enjoy commercial success, and provide a significant benefit to users.

One persistent problem, however, concerns the processing of so-called "exceptions." Broadly, an exception is financial document or transaction that is not amenable to being processed by image capture or IRD. In a system that is focused on smoothly processing electronic representations of checks and other documents, exceptions provide a significant problem. Typically, in order to process an exception, a bank must find the original paper documents in storage somewhere, retrieve the documents, and process them manually. This is time consuming, for people to locate and retrieve the document, and also for people to hand process the document. Moreover, the situation presents a significant opportunity for error.

Exceptions, then, provide a significant impediment to a bank's otherwise smooth and automated processing of scanned images.

SUMMARY OF THE INVENTION

Broadly, the present disclosure concerns a computer-implemented system to track, process, and report exceptions arising from processing of electronic representations of checks and other financial documents.

The teachings of this disclosure may be implemented as a method, apparatus, logic circuit, storage medium, or a combination of these. This disclosure provides a number of other advantages and benefits, which should be apparent from the following description.

BRIEF DESCRIPTION OF THE DRAWINGS

FIG. 5 is a table showing some exemplary exception conditions.

FIGS. 6A-6B are a screen shots showing exemplary pick lists.

DETAILED DESCRIPTION

Figure 1:
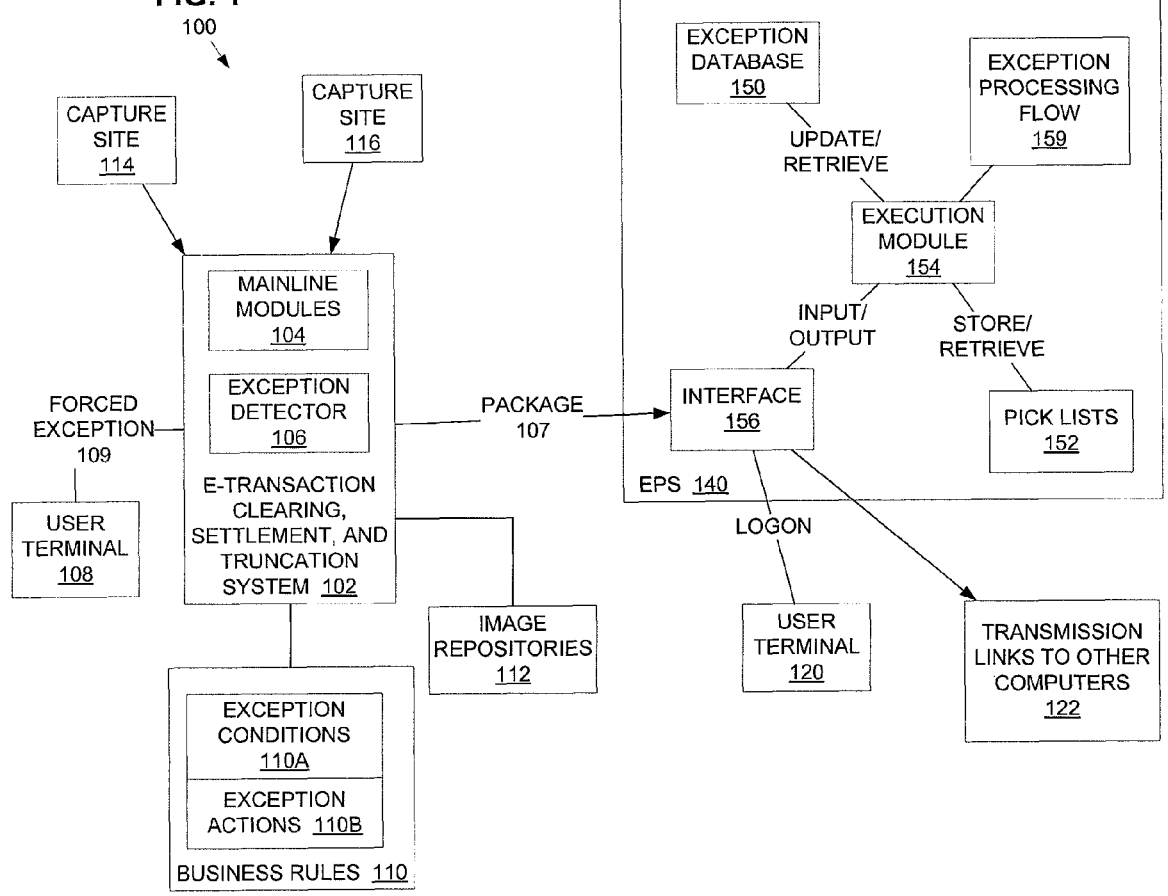
FIG. 1 is a block diagram of the components and interconnections of a computer driven system to track, process, and report exceptions arising from processing of electronic representations of checks and other financial documents.

The nature, objectives, and advantages of the invention will become more apparent to those skilled in the art after considering the following detailed description in connection with the accompanying drawings.

Hardware Components & Interconnections

Introduction

One aspect of the present disclosure concerns a computer-implemented system 100 to track, process, and report exceptions arising from processing of electronic representations of checks and other financial documents.

The system 100, as currently described, pertains to a single institution such as a bank, credit union, building society, stock brokerage, asset management firm, etc. For ease of reference, the discussion is simplified by using "bank" to refer to an entity (such as a bank) for whose benefit the system 100 operates. Image capture technology, in the illustrated example, primarily includes the capture of checks. However, this disclosure contemplates the capture of other document types such as general ledger (GL) tickets, deposit slips, withdrawal slips, savings bonds, treasury tax and loan coupons, and other documents related to financial transactions.

In the system 100, there are various data processing components, such as an e-transaction clearing, settlement, and truncation (CST) system 102 and an exception processing system (EPS) 140. Each of these may be implemented by hardware, firmware, software, or a combination of the foregoing. The makeup of these subcomponents is described in greater detail below, with reference to FIGS. 2-4.

In one example, the system 100 may be implemented by one or more computers such as notebook or desktop computer, computer workstation, distributed or centralized computing network, mainframe computer, or other suitable computing arrangement.

Structural Components

The hardware components and interconnections of the system 100 are now described in greater detail. Some broad description of the functions of these components is included to help describe a coherent system, but the operational details of the system 100 components are described elsewhere, and namely, beneath the "OPERATION" heading below.

CST System

The CST system 102 is a centralized computing facility to perform clearing, settlement, and truncation of scanned documents. The CST system 102 includes mainline modules 104 and an exception detector 106.

In one example, the modules 104 include computing equipment running commercially available software such as one or more components of the ImageMark™ software suite by NCR. Some exemplary ImageMark components for this purpose include ImageMark Transaction Manager, ImageMark ECPIX (Electronic Cheque Presentment with Image Exchange), ImageMark Ncompass, ImageMark Deposit Review, and the like. ImageMark Transaction Manager is an image-based, enterprise-wide data quality engine to manage multiple deposit workflows from the branch, ATM, and commercial customer. The product utilizes advanced recognition, image quality, balancing and reject repair technologies to validate all data and images before sending them to IRD printers, transit banks, and archives. ImageMark ECPIX supports the clearing of check and payment transactions, ultimately supporting transaction at any point along the payment stream. The ImageMark ECPIX provides functionality for a bank to truncate physical checks and implement the full clearing and settlement cycle electronically.

Among others, one function of the module 104 is to associate scanned documents with various tags in order to link them with various paper truncation sites and paper capture sites. Upon arrival at the CST system 102, the scanned images may already have certain other tags for other purposes, such as uniquely identifying each document.

The exception detector 106 is an added component, relative to the mainline modules 104. This is a custom product developed specifically to implement the system 100, and is not commercially available. Broadly, the detector 106 serves to detect the occurrence of exceptions in the mainline modules 104, and in response, take various prescribed actions. In one specific example, the detector 106 is implemented by software organized or written in a language such as Java, or any other suitable language. In this example, the software of the detector 106 is executed by the same machine that provides the modules 104.

Business Rules

More particularly, the exception detector 106 operates in accordance with the business rules 110, which further include exception conditions 110*a* and exception actions 110*b*. The conditions 110*a* prescribe the various conditions 110*a* that constitute exceptions, and the actions 110*b* prescribe the appropriate steps to be taken for each corresponding exception. In one example, the actions 110*b* may call for the detector 106 to transmit an information package 107 to the EPS 140, and further prescribe the makeup of the information package 107.

Capture Sites

The CST system 102 is coupled to various capture sites such as 114, 116. Each these may be implemented by an automated teller machine (ATM), store, banking branch, lock box, cash vault, or other site where paper documents are scanned into images. Paper documents are stored here, at least temporarily.

User Terminals

The CST system 102 is also coupled to various user terminals such as 108. The user terminals may be computers and/or non-computing video displays with keyboards. In one example, the CST system 102 is web-based, meaning that it is accessible to user terminals 108 operating browsers over a private network such as company Intranet or other digital packet data network.

Document Repositories

The CST system 102 stores images of scanned financial documents in the image repositories 112. The repositories 112 may employ any suitable digital data storage media, and many examples of storage media are given below. As for the formats for storing images in the repositories 112, these are well known in the relevant art. In addition to the image repositories 112, there are numerous paper truncation sites providing long term storage for paper documents.

EPS 140

The EPS 140 is a system to track, process, and report exceptions reported by the CST system 102. The EPS 140 is implemented by digital data processing equipment, which may be the same or separate from the CST system 102. In one example, the EPS 140 is implemented separately from the CST system 102 by an IBM mainframe computer with a Z/Linux platform. The EPS 104 is best described by addressing its components, as follows.

Execution Module & Exception Processing Flow

The execution module 154 is described as a general purpose computing module that acts specifically according to the exception processing flow 159. In one implementation, there are various predefined stages for processing an exception to completion, and the flow 159 employs these stages to determine the status of an exception item relative to the overall flow, and to determine what activity to perform next. For example, the flow may prescribe prompting a user for action, gathering data from another computer, updating an exception database 150, updating or creating a pick list 152, sending data to another computer or user terminal, etc.

In one example, the module 154 and sequence 159 are implemented by software written in a language such as Java.

Exception Database

One action of the execution module 154, operating according to the flow 159, is to store, update, and retrieve data from an exception database 150. In this example, the database 150 stores a record of past and present exceptions processed at the EPS 140 and may, for example, include a listing identifying each exception, when it occurred, all activity pertaining to the exception, and the like. The database 150 may employ any suitable digital data storage media, with many examples being given below. The database 150 may employ any suitable storage format, such as linked lists, tables, relational databases, strings, files, pages, documents, or any other data structure. In one example, the database 150 is a DB2 type database residing on a blade server.

Pick Lists

Another action of the execution module 154, operating according to the flow 159, is to prepare, store, and retrieve various pick lists 152. In this example, each of the pick lists 152 pertains to a particular exception, and provides a "to do" list for specified people that access the EPS 140 to use in resolving the exception. In one example, each pick list is configured as a table that lists one or more exceptions. The pick list presents various options for users to perform in connection with the exceptions in the pick list. By virtue of how the execution module 154 constructs a pick list, and more particularly, which pull-down or other menus (or other graphical user interface features) of the pick list are enabled or disabled, this guides users to follow a designated procedure to resolve exceptions. The pick lists, as illustrated in these examples, are web accessible by users such as people at terminals 120 or elsewhere. Details of the pick lists 152 are explained further below.

Interface

To communicate with components external to the EPS 140, the EPS 140 includes one or more interfaces 156. These may include devices such as modems, transceivers, conversion utilities, or other I/O products. The interfaces 156 may employ communication media such as fiber optics, Internet, Intranet, local or wide area network, wireless, satellite, telephone lines, copper cable, patch cables, etc.

In one respect, the interface 156 is useful because the execution module 154, operating according to the flow 159, interacts with users to receive information, satisfy queries, issue reports, and the like. Users may interact with the EPS 140 via user terminals such as 120. These may be computing machines (such as PCs, workstations, cell phones, PDAs, etc.) and/or non-computing video display terminals with keyboards. In one example, the EPS 140 is web-based, meaning that it is accessible to user terminals 108 operating browsers via private network such as company Intranet or other digital packet data network.

The interface 156 is also useful because the execution module 154, operating according to the flow 159, prepares and transmits packages of information to other computers in the banking system. In this regard, the transmission links 122 may include any digital media, for transmitting messages formatted as e-mail, fax, IP packets, or a proprietary format. In a specific example, the link 122 may employ MQ messaging.

Another utility of the interface 156 is to aid the EPS 140 in receiving exception packages from the CST system 102. In this respect, the interface 156 serves to receive data that is analogous to the types of data transmitted via 122.

Exemplary Digital Data Processing Apparatus

As mentioned above, data processing entities (such as the CST system 102 and EPS 140) may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
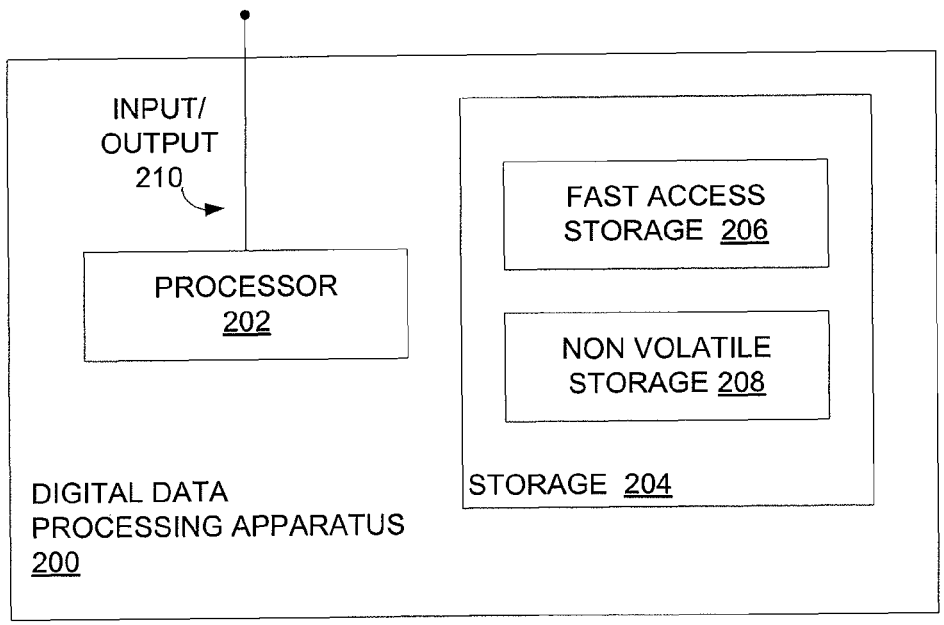
FIG. 2 is a block diagram of a digital data processing machine.
Figure 3:
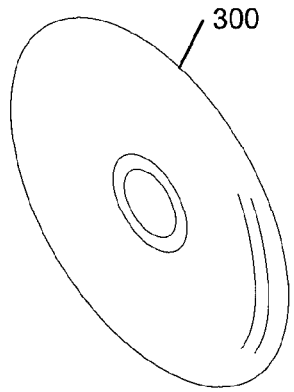
FIG. 3 shows an exemplary storage medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to embody storage components of the system 100 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism appropriate for digitally storing machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions (as described above), a different embodiment uses logic circuitry to implement some or all of the digital data processing features mentioned above.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
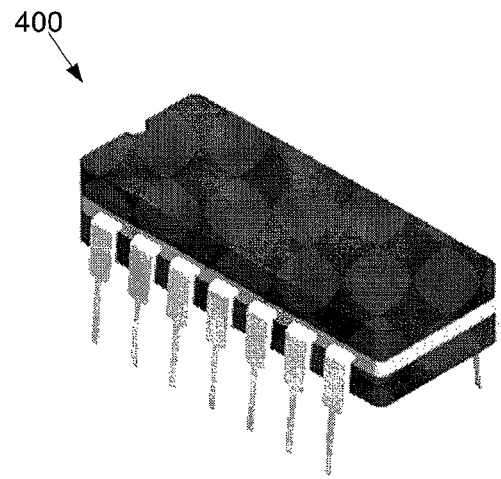
FIG. 4 is a perspective view of exemplary logic circuitry.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied in hardware, firmware, in a software module executed by hardware, or in a combination of these.

Data Architecture

The preceding description addressed the hardware components and interconnections of the system 100. The material beneath this heading more specifically addresses the nature of the constituent data and related calculations.

Business Rules

As mentioned above, the business rules 110 include conditions 110a and actions 110b. The exception conditions 110a prescribe the criteria used to recognize exceptions. These define predefined conditions where an item cannot be processed by image capture or IRD. The table 500 in FIG. 5 illustrates some examples 502-510 of exception conditions. Exception 502 (legal group, monetary), refers to exceptions that cannot be cleared via scanned image or IRD, and still need to be posted. Examples include savings bonds and foreign items. Exception 504 (legal group, non-monetary), refers to exceptions that need to be sent to a department via paper, but do not need to be posted. Examples include TTLs, non-negotiables, etc. Exception 506 (illegible) refers to items that are either bad images or have illegible information. Exception 508 (piggyback) refers to cases where two or more items were erroneously scanned together. Exception 510 (out of balance) refers to transactions that cannot be balanced due to missing tapes or items. Exception 512 (currency) refers to transactions that involve currency that has been accidentally scanned with the deposit. One example is currency found with a bundle of checks.

The exception actions 110b instruct the detector 106 how to act when an exception is detected. Broadly, when an exception is found, the detector 106 prepares an information package 107 and transmits the package to the EPS 140. Although this action is broadly the same for different exceptions, there are differences in the type of information package 107 that is prepared, as explained below.

Packages

Generally, exception packages 107 may include information such as the following:

Scanned image of the item.
Cycle date of the CST system 102.
Physical paper storage location.
Location of relevant paper capture site.
Original entry number of the CST system 102.
Original batch ID.
Item's original (day 1) item sequence number.
External item ID.
Transaction amount.
The account number of the item.
The item's RT number.
Number code of the adjustment type in the CST system 102.
Account number of the credit that the item belongs to.
Amount of depositing credit.
ISN of depositing credit.
Sequence number.
Offset information.
Magnetic ink character recognition (MICR) line information.
Adjustment entries inserted into the transaction.

Furthermore, as to items of exception type 508 (piggyback), the package 107 may further include (1) all data pertaining to the last good items before and after the piggyback (as if each of these items was to have a package 107 prepared for it), and (2) the amount of piggyback adjustment. In one example, the packages 107 are transmitted from CST system 102 to EPS 140 by NDM (network data mover) with Secure+.

Exception Database

As mentioned above, the exception database 150 stores a record of past and present exceptions processed at the EPS 140 and may, for example, include a listing identifying each exception, when it occurred, all activity pertaining to the exception, and the like. In addition, the record of an exception in the database 150 further includes all of the information from the package 107 initially sent by the CST system 102 for that exception, along with a listing of the type of exception.

Pick Lists

As mentioned above, pick lists 152 set forth pending exceptions, and serve to guide users that access the EPS 140 in resolving the named exceptions. The following types of information are some examples of what may be included in a pick list, as to a particular exception: exception type, date captured, exception status, capture site, paper site, transaction amount, account number. Further information may be included, such as CST system 102 cycle date, entry number, batch number, and ISN.

In the illustrated example, pick lists are arranged in tabular form, and contain the same column headings regardless of the type of exception. Of course, the content under each heading will vary according to the details of each exception. Pick lists, in this example, are sortable by each column heading, and may also be subject to filtering by various criteria.

Figure 6B:
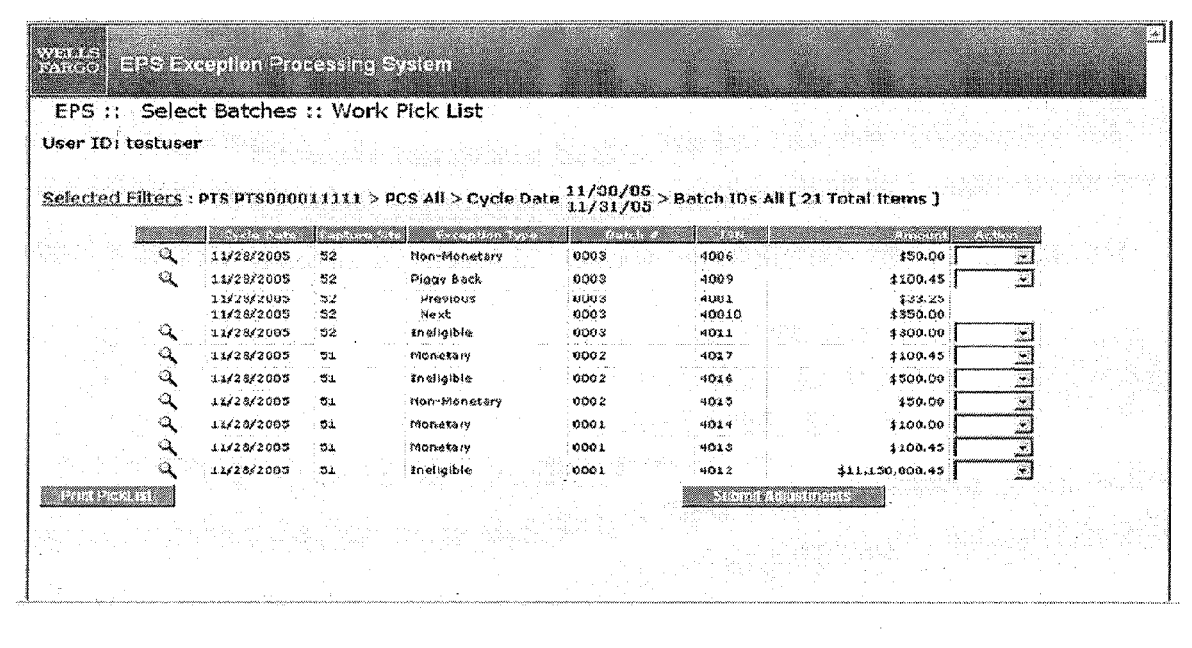

FIGS. 6A-6B illustrate screen shot of some an exemplary pick lists. FIG. 6A shows an initial pick list, with options to mark exceptions as missing, found, or holdover. FIG. 6B shows a subsequent screen, that the execution module 154 presents as the user is engaged in carrying out actions with the pick list. Here, the EPS 140 is presenting further options for exceptions, such as making adjustments.

As mentioned above, each item appearing in a pick list is presented with an option to be marked as missing, found, or holdover (FIG. 6A). The pick list also includes a submit button (FIG. 6B), which is used to signal the EPS 140 to proceed to the next stage, such as creating appropriate tickets for the items marked by the user.

As mentioned above, pick lists guide users by requiring them to follow a designated procedure to resolve exceptions. The EPS 140 provides this guidance by enabling, disabling, expanding, contracting, or otherwise modifying pull-down menus, radio buttons, or other menus or options in the pick list according to what action is required next to resolve the exception. In other words, different options are enabled depending upon the type of exception and the level of progress toward solving the exception. The operation and content of pick lists are described in greater detail below.

Overall Sequence of Operation

Introduction

Figure 7:
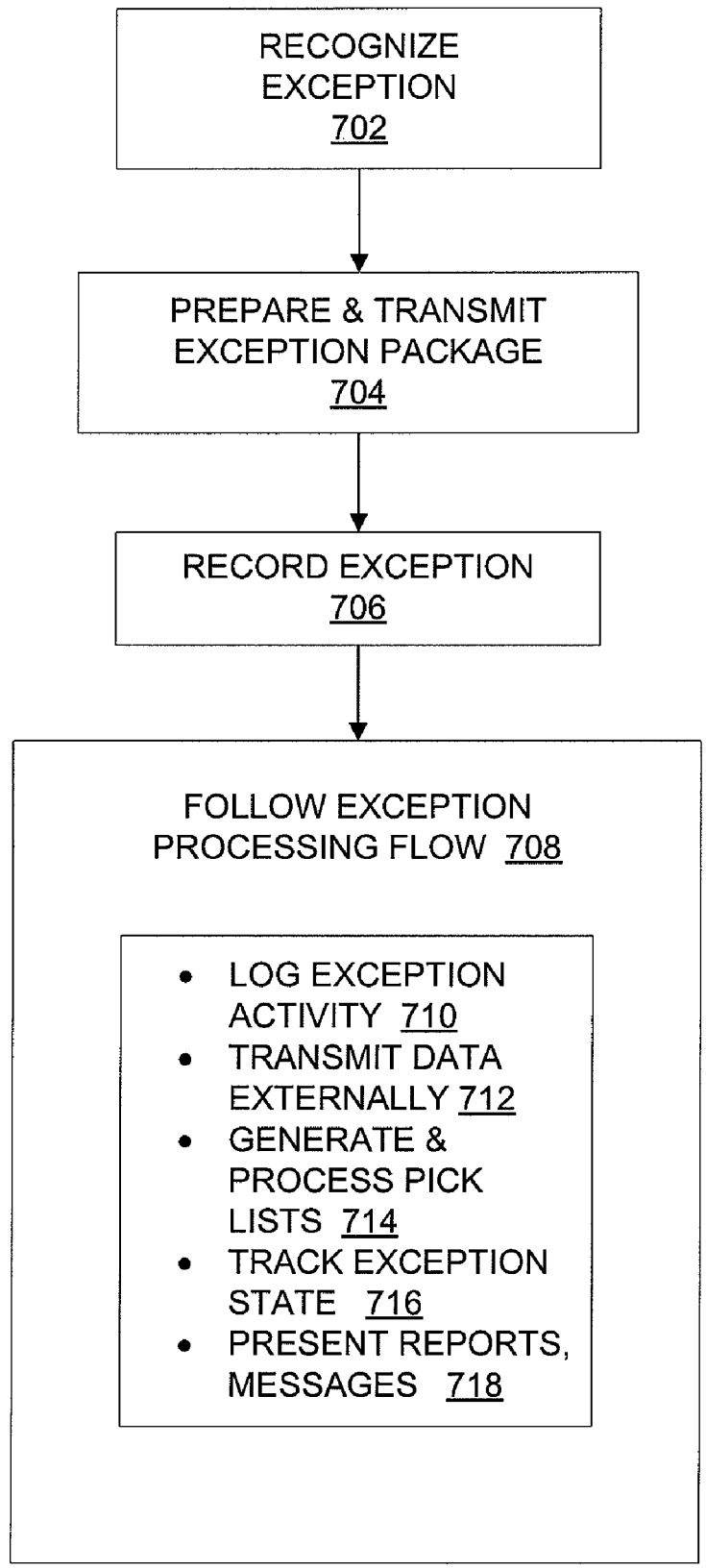
FIG. 7 is a flowchart of a computer-driven operating sequence.

FIG. 7 shows a sequence 700 for operating the system 100 in order to process exceptions arising from processing of electronic representations of financial documents.

Recognize Exception

In step 702, the CST system 102 applies the conditions 110*a* to automatically recognize exceptions arising from scanned paper items. More particularly, this step is performed by the exception detector 106 component. In one example, the CST system 102 performs step 702 on a periodic basis, or according to a non-periodic schedule. In another example, step 702 is event-driven rather than time-driven. For example, step 702 may be performed automatically in response to events such as: item R/T being corrected and keyed by a user (in the CST system 102), the CST system 102 detecting that the R/T is found in a specific R/T list, the CST system 102 finds that the item carries a bad image flag, etc. In still another example, step 702 may be performed at a fixed point of processing each scanned image, such as initial scanning, first receipt at the CST system 102, storage in a repository 112, or some other stage.

In one example, a user with appropriate authentication and permissions may manually declare an exception, which is called a "forced" exception 109 (FIG. 1). The forced exception is issued by user command, for example, by a terminal 108 logged-in to the CST system 102. As an alternative, users may declare exceptions at the EPS 140.

Prepare/Transmit Exception Package

In response to the detection of an exception in step 702, the detector 106 automatically takes appropriate action as specified by 704. The act of detecting an exception may be considered the same as declaring an exception. Alternatively, declaring an exception may involve further steps, as prescribed by the actions 110*b* and performed as part of step 704. For example, declaring an exception may include operations such as a user of the CST system 102 creating an adjustment/correction entry, utilizing defined adjustment/correction types.

Another action prescribed by 110*b* is for the detector 106 to prepare and transmit an exception package 107 to the EPS 102. The package 107 contains predetermined types of information tailored to the nature of the declared exception, as explained in detail above.

Record Exception

In response to receiving exception packages from the CST system 102, the execution module 154 stores received exception packages in the exception database 150 (step 706).

Exception Processing Flow & Options

And, for each exception arriving at the EPS 140, the execution module 154 takes action 708 according to the predetermined exception processing flow 159. The menu of possible actions under the exception processing flow includes, without limitation, operations 710-718.

Log Exception

In operation 710, the execution module 154 updates the exception database 150 to reflect a change or addition in the representation of an exception in the database, and/or the status of the exception in the database.

Transmit Data

In operation 712, the execution module 154 prepares and transmits information externally of the EPS 140, via the interface 156 and transmission links 122. Some examples of this operation include transmission of items/transactions that are needed for further research in other departments/systems of the bank. For instance, the EPS 140 may transmit data externally after a user takes action such as marking an item as found or missing, or other activity as discussed above in conjunction with pick lists.

Generate and Process Pick Lists

In operation 714, the execution module 154 autogenerates pick lists 152. As mentioned above, each pick list guides users in processing and ultimately resolving exceptions, according to the prescribed exception processing flow 159. As mentioned above, the pick lists guide users in resolving exceptions by their menu structure and enabled/disabled options, and which screens are presented to the user.

In one implementation, the initial pick list is the same for all exception types. The initial pick list presents options to mark each exception as missing, found, or holdover. The initial pick list also presents a box for the user to enter free form comments. When the user selects "submit," the EPS 140 saves information related to the disposition of the items on that pick list. The option selected for each exception, along with the exception type, will determine how the EPS 140 responds as to creation of corresponding accounting entries and tickets.

The following provides a more detailed description of an exemplary pick list for exception group 502 (legal group, monetary). (1) Responsive to the user marking an item as found, the EPS 140 creates offsetting GL entry information for the amount of the original CST system 102 adjustment to be used to offset the entry on the EPS GL line. This GL entry information may be printed on a physical piece of paper for processing or sent electronically (via the link 122) to an accounting system. The execution module 154 marks the item as complete in the database 150. (2) If the user marks an item as missing, the EPS 140 creates an electronic adjustment (debit or credit) and sends it to a GL accounting system (not shown) via the link 122, then creates an electronic adjustment (debit or credit) and sends it via 122 to a corresponding research system (which is identified based on business rules specified by the flow 159) for the amount of the original CST system 102 adjustment, so that people can perform additional research on the item. The item is marked as complete in the database 150. (3) If the user selects an item for holdover, the EPS 140 does not create a ticket. The execution module 154 lets the item remain in the EPS 140 for further processing, with the original capture date.

The following provides a more detailed description of an exemplary pick list for exception group 504 (legal group, non-monetary). (1) If a user marks an item as found, the EPS 140 does not create a ticket. The EPS 140 marks the item as complete in the database 150. (2) If Item is selected as missing, the EPS 140 does not create a ticket. The execution module 154 marks the item as complete in the database 150. (3) If the user selects an item for holdover, the EPS 140 does not create a ticket. The EPS 140 retains control of the item, with original cycle date.

The following provides a more detailed description of an exemplary pick list for exception group 506 (illegible image). (1) If a user marks an item as found, the EPS 140 creates an offsetting GL entry information for the amount of the original CST system 102 adjustment to be used to offset the entry on the EPS GL line. This GL entry information may be printed on a GL ticket. The EPS 140 marks the item as complete in the database 150. (2) If a user marks an item as missing, the EPS 140 creates an electronic adjustment (debit or credit) and sends it via 122 to a GL accounting system, then creates an electronic adjustment (debit or credit) and transmits it to an appropriate research system (identified based on business rules contained in the flow 159) for the amount of the original CST system 102 adjustment, so that people can perform additional research on the item. The EPS 140 marks the item as complete in the database 150. (3) If a user selects an item for holdover, the EPS 140 does not create a ticket. The item remains in EPS 140, with its original cycle date.

The following provides a more detailed description of an exemplary pick list for exception group 508 (piggyback). (1) If a user marks an item as found, the EPS 140 creates offsetting GL entry information for the amount of the original CST system 102 adjustment to be used to balance the EPS GL line. This GL entry information may be printed on a GL ticket, or transmitted (via 122) elsewhere for processing. The EPS 140 marks the item as complete in the database 150. (2) If a user marks one or more selected items as re missing, the EPS 140 creates an electronic adjustment (debit or credit) and sends it via 122 to the GL accounting system, then creates an electronic adjustment (debit or credit) to a corresponding research system (identified based on business rules in the flow 159) for the amount of the original CST system 102 adjustment, so that people can perform additional research on the item. The EPS 140 marks the item as complete in the database 150. (3) If a user has selected one or more items for holdover, the EPS 140 does not create a ticket. The item remains in the EPS 140, with its original capture date.

The following provides a more detailed description of an exemplary pick list for exception group 510 (out of balance). A balance option presents an appropriate screen prompting the user to manually put the current transaction into balance. Another option sends the current transaction to another site that is better equipped to perform balancing; in this option, the EPS 140 selects the site, but the user can override. Another option permits the user to mark the status of the current exception as found. This triggers further action at the EPS 140, for example, creating an offset in the case of a bad image, but refraining from creating an offset in the case of TTL coupon. Another option permits the user to mark an image as missing. Still another option allows the user to designate an exception for holdover, which leaves the exception in the EPS 140 until the next day, for example in case the paper has not been received. Another option creates a research case for handling by a research group. Another option creates a placeholder entry in the case of ATM or other papers not yet received, etc.

The following provides a more detailed description of an exemplary pick list for exception group 512 (currency), in the case where currency is needed to balance. (1) if a user marks an item as found, the EPS 140 creates an electronic adjustment (debit or credit) to the EPS GL line that was hit in the CST system 102, for the amount of the item, and create the appropriate offsetting financial entries and sends them via 122 to a currency accounting system (not shown). The EPS 140 marks the item as complete in the database 150. (2) If the user marks an item as missing, the EPS 140 creates an electronic adjustment (e.g., debit or credit) and sends it to a GL accounting system via 122, and then creates and sends an electronic adjustment (debit or credit) via 122 to a corresponding research system (identified based on business rules in the flow 159) for the amount of the item, so that people can perform additional research on the item. The EPS 140 marks the item as complete in the database 150. (3) If the user selects an item for holdover, the EPS 140 does not create a ticket. The item is to remain in the EPS 140 for further processing, within original capture date.

Where currency is not needed to balance, the exception group 512 pick list operates as follows. (1) If the user marks an item as found, the EPS 140 creates an electronic adjustment (debit or credit) for zero dollars, and sends it to the GL accounting system via 122. The EPS 140 prompts the user to enter the dollar amount of the currency. The EPS 140 provides a dual control process for the entering of the currency amount. (i.e., additional user ID and password before continuing) The EPS 140 then creates the appropriate offsetting financial entries and transmits them via 122 to a currency accounting system. Then, the EPS 140 makes an electronic adjustment (debit), and transmits it via 122 to a corresponding research system (identified based on business rules in the flow 159) for the amount that was entered by the user. The EPS 140 marks the item as complete in the database 150. (2) If the user marks an item as missing, the EPS 140 creates an electronic adjustment (debit or credit) and sends it via 122 to a GL accounting system, then the EPS 140 creates an electronic adjustment (debit or credit) that is transmitted via 122 to a corresponding research system (identified based on business rules in the flow 159) for the amount of the adjustment, so that people can perform additional research on the item. The EPS 140 marks the item as complete in the database 150. (3) If the user selects an item for holdover, the EPS 140 does not create a ticket. The item is to remain in the EPS 140 for processing, with original capture date.

Track Exception State

In operation 716, the execution module 154 obtains and scrutinizes data that affects the state of exceptions contained in the database 150. This includes reviewing and scrutinizing all of the following for the occurrence of activity affecting exception state: (1) user input received at the EPS 140, (2) activity affecting an exception that occurs externally to the EPS 140, for example, in the CST system 102, (3) actions taken by the EPS 140 to process an exception, e.g., transmitting information via 122, updating exception state or information in the database 150, etc. Some examples of activities affecting exception state include marking an item as found, marking an item as missing, marking a transaction as "in balance," etc. xxx Output In operation 718, the execution module 154 generates and presents reports and various messages to users at terminals such as 120, via the interface 156. This includes the presentation of user-specific pick lists, prepared in step 714, to logged-in users. This also includes messages reporting a current state of a given exception to users. Some further examples of operation 718 include preparing and presenting lists of items processed by site, list of items processed by user, list of items being sent to another location for processing, list of items being sent for further research. The EPS 140 may also transmit reports and messages to other destinations, such as other computers 122 (via the interface 156), the CST system 120 (via the interface 156), etc.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method for processing exceptions arising from processing of scanned images of paper financial documents, comprising operations of:

in an electronic transaction clearing, settlement, and truncation (CST) system, programmed to receive and process scanned images of paper financial documents received from scanning sites, performing additional operations comprising:
applying a predetermined set of conditions to automatically recognize predetermined classes of exceptions arising from the scanned images;
in response to a recognized exception, the CST preparing an exception package containing predetermined types of information tailored to the class of the recognized exception, and sending the prepared exception package to an exception processing system (EPS);

the exception processing system (EPS) performing operations comprising:
responsive to receiving exception packages from the CST system, storing the received exception packages in an exception database;
for each exception represented by an exception package, taking action to resolve the exception by applying a predetermined exception processing flow to the exception, where a menu of available actions under the exception processing flow includes all of the following:
assembling and transmitting data to people or computing equipment external to the EPS;
autogenerating web-accessible pick lists and providing the pick lists to logged-in users, where each pick list acts in furtherance of the predetermined exception processing flow to aid in resolving exceptions by providing data for users to consider in resolving the exception and also prompting users to submit information;
monitoring activities affecting exception state, said activities including user input received at the EPS, activity pertaining to the exception as detected by the EPS, and actions taken by the EPS;
updating representation of exceptions in the database according to activities affecting exception state;
presenting messages to logged-in users including reports of a current state of exceptions.

2. The method of claim 1, further comprising, in addition to the automatically recognizing predetermined classes of exceptions arising from the scanned images, one or both of the CST system and EPS accepting direct designation of exceptions by users.

3. The method of claim 1, the operations of assembling and transmitting data to people or computing equipment external to the EPS including messages in formats including: email, facsimile, instant message, messages in formats proprietary to the financial institution.

4. The method of claim 1, where the operations of autogenerating pick lists include selectively enabling graphical user interface options in pick lists presented to users to guide users in resolving exceptions.

5. The method of claim 1, where the EPS is programmed to perform all actions in the following list, each action being performed individually in response to user submittal of information via pick lists:
creating debit, credit, other adjustments;
creating or modifying ledger entries or tickets;
creating offsets;
balancing one or more transactions;
printing ledger information;
requesting action by a research group;
requesting user entry of specified data.

6. A computer-implemented method for processing exceptions arising from processing of scanned images of paper financial documents, comprising steps of:

in an electronic transaction clearing, settlement, and truncation (CST) system, programmed to receive and process scanned images of paper financial documents received from scanning sites, performing additional steps comprising:

a step for applying a predetermined set of conditions to automatically recognize predetermined classes of exceptions arising from the scanned images;

a step for, in response to a recognized exception, the CST preparing an exception package containing predetermined types of information tailored to the class of the recognized exception, and sending the prepared exception package to an exception processing system (EPS);

the exception processing system (EPS) performing steps comprising:

a step for, responsive to receiving exception packages from the CST system, storing the received exception packages in an exception database;

for each exception represented by an exception package, a step for taking action to resolve the exception by applying a predetermined exception processing flow to the exception, where a menu of available actions under the exception processing flow includes all of the following:

a step for assembling and transmitting data to people or computing equipment external to the EPS;

a step for autogenerating web-accessible pick lists and providing the pick lists to logged-in users, where each pick list acts in furtherance of the predetermined exception processing flow to aid in resolving exceptions by providing data for users to consider in resolving the exception and also prompting users to submit information;

a step for monitoring activities affecting exception state, said activities including user input received at the EPS, activity pertaining to the exception as detected by the EPS, and actions taken by the EPS;

a step for updating representation of exceptions in the database according to activities affecting exception state;

a step for presenting messages to logged-in users including reports of a current state of exceptions.

7. A computer program embodied in one or more non-transitory computer readable media to perform operations to process exceptions arising from processing scanned images of paper financial documents in place of the paper financial documents or to install a target computer program on one or more computers where the target program upon installation is executable to perform said operations, where said operations comprise:

in an electronic transaction clearing, settlement, and truncation (CST) system, programmed to receive and process scanned images of paper financial documents received from scanning sites, performing additional operations comprising:

applying a predetermined set of conditions to automatically recognize predetermined classes of exceptions arising from the scanned images;

in response to a recognized exception, the CST preparing an exception package containing predetermined types of information tailored to the class of the recognized exception, and sending the prepared exception package to an exception processing system (EPS);

the exception processing system (EPS) performing operations comprising:

responsive to receiving exception packages from the CST system, storing the received exception packages in an exception database;

for each exception represented by an exception package, taking action to resolve the exception by applying a predetermined exception processing flow to the exception, where a menu of available actions under the exception processing flow includes all of the following:

assembling and transmitting data to people or computing equipment external to the EPS;

autogenerating web-accessible pick lists and providing the pick lists to logged-in users, where each pick list acts in furtherance of the predetermined exception processing flow to aid in resolving exceptions by providing data for users to consider in resolving the exception and also prompting users to submit information;

monitoring activities affecting exception state, said activities including user input received at the EPS, activity pertaining to the exception as detected by the EPS, and actions taken by the EPS;

updating representation of exceptions in the database according to activities affecting exception state;

presenting messages to logged-in users including reports of a current state of exceptions.

8. A system including an electronic transaction clearing, settlement, and truncation (CST) system and an exception processing system (EPS), the system being programmed to process exceptions arising from processing scanned images of paper financial documents, the system comprising:

the electronic transaction clearing, settlement, and truncation (CST) system, comprising:

mainline modules programmed to receive and process scanned images of paper financial documents received from scanning sites;

an exception detector to automatically recognize predetermined classes of exceptions arising from the scanned images;

a predetermined set of rules, directing the CST system in response to a recognized exception to prepare an exception package containing predetermined types of information tailored to the class of the recognized exception, and send the prepared exception package to the exception processing system (EPS);

the exception processing system (EPS), comprising:

an exception database to store exception packages received from the CST system;

a predetermined exception processing flow prescribing actions appropriate to exceptions represented by the exception packages, where a menu of available actions under the exception processing flow includes: assembling and transmitting data to people or computing equipment external to the EPS;

autogenerating web-accessible pick lists and providing the pick lists to logged-in users, where each pick list acts in furtherance of the predetermined exception processing flow to aid in resolving exceptions by providing data for users to consider in resolving the exception and also soliciting information for users to submit;

monitoring activities affecting exception state, said activities including user input received at the EPS, activity pertaining to the exception as detected by the EPS, and actions taken by the EPS;

updating representation of exceptions in the database according to activities affecting exception state;

presenting messages to logged-in users including reports of a current state of exceptions;

an execution module to carry out the exception processing flow.

* * * * *